United States Patent
Welker et al.

[11] Patent Number: 6,058,967
[45] Date of Patent: May 9, 2000

[54] MAGNETIC ACTIVATION SYSTEM FOR SWITCH

[75] Inventors: Paul E. Welker; Michael J. Mullally, both of Clifton Springs, N.Y.

[73] Assignee: ValveTech, Inc., Phelps, N.Y.

[21] Appl. No.: 08/991,257

[22] Filed: Dec. 17, 1997

[51] Int. Cl.[7] ................................................. F16K 37/00
[52] U.S. Cl. ...................... 137/554; 137/553; 251/129.15
[58] Field of Search .................................... 137/554, 553; 251/129.15

[56] References Cited

U.S. PATENT DOCUMENTS

| | | | |
|---|---|---|---|
| 3,842,377 | 10/1974 | Barndt | 200/302 |
| 3,896,280 | 7/1975 | Blake | 200/81.9 M |
| 4,150,350 | 4/1979 | Fong | 335/206 |
| 4,481,389 | 11/1984 | Johnson | 73/308 |
| 4,498,495 | 2/1985 | Worwood et al. | 137/554 |
| 4,499,347 | 2/1985 | Richards | 200/81.9 M |
| 4,674,338 | 6/1987 | Carpenter | 200/81.9 M |
| 4,906,807 | 3/1990 | Siebert et al. | 200/81.9 M |
| 5,144,977 | 9/1992 | Eggerton et al. | 137/554 |
| 5,183,983 | 2/1993 | Knop | 200/81.9 M |
| 5,450,049 | 9/1995 | Bachmann | 200/61.45 R |

*Primary Examiner*—A. Michael Chambers
*Attorney, Agent, or Firm*—Eugene Stephens & Associates

[57] ABSTRACT

An indicating or activating system has a follower arranged to follow the movement of a valve body. The follower swings about a pivot and moves between two positions. In one of the positions, the follower activates a switch. The switch can be connected to an indicator to indicate a state of the valve body or can be connected to another component whose state is dependent on the valve state. In essence, the device itself is an indicator of the valve state.

32 Claims, 2 Drawing Sheets

MAGNETIC ACTIVATION SYSTEM FOR SWITCH

TECHNICAL FIELD

The invention relates to the field of activation and indicating systems that operate without mechanical connections to the elements they activate or about which they provide information. The invention particularly relates to the determination of a valve operating condition or state.

BACKGROUND OF THE INVENTION

The operating state of a valve must often be known for proper operation of a device in which the valve is used. One way to monitor a valve's operating state is with a mechanical connection to a valve component, such as a valve body. However, conventional mechanical connections to valve components require seals that must prevent leakage, yet allow the connection to operate. In valves handling extremely aggressive fluids, seal connections create a risk of damage to other components if the seal connections fail. Thus, it is desirable to use an operating state indicator that does not require such a mechanical connection and its associated seals so that the risk of fluid leakage can be reduced, if not eliminated.

Some prior art remote indicating systems rely on magnets mounted on the valve bodies. While these function satisfactorily in most environments, the magnets can be destroyed in more hostile environments. For example, the hydrazine used in dual-fuel thruster systems can corrode such magnets. There is, therefore, a need for a remote valve status indicating system that does not rely on magnets exposed to the fluid controlled by the valve for which the system provides information.

Additionally, the stroke required by prior art valves to activate their switches requires large valve envelopes or housings. This increases the size of the valve, which results in increased weight and cost. In spacecraft applications, the increased size and weight reduce the amount of payload that can be carried by the spacecraft or increase launching costs. Thus, there is a need for a magnetic switch activation system that allows a valve with a shorter stroke to be used.

SUMMARY OF THE INVENTION

A follower is mounted about a valve housing so that it follows a non-magnetic valve body when it travels within the housing. The valve body is made from a ferromagnetic material, and the follower has magnets arranged so that the force of attraction between the valve body and the magnets causes the follower to move in response to movement of the valve body. We prefer to use a pivoting follower in the form of a swingarm mounted to the casing or to the housing of the valve. A switch is mounted near the path of the follower so that the follower can activate the switch. Thus, our device is also a magnetic switch activation system.

As a result of the remote location of the follower, the state of the valve can be determined without a mechanical connection to the valve body. The risk of leakage created by such a mechanical connection is thus eliminated. Also, because of the use of the ferromagnetic valve body and magnetic follower, no magnet need be mounted on the valve body as was required in prior art devices. Our device can, therefore, be used to remotely determine the states of valves that control fluids destructive to magnets, unlike prior art devices. We also eliminate the requirement of mounting a magnet on the valve body and can use parts already present in valves as part of our indicating system. This allows us to retrofit already existing valves with our remote indicating system without disassembling the valves and inserting new parts.

Our system also effectively amplifies the valve stroke since for a given displacement of the valve body, the tip or activating portion of the swingarm is moved through a greater linear distance. This amplification allows the use of a smaller valve stroke, which allows the use of a smaller valve housing or envelope, which in turn results in weight and cost savings. The reduced size and weight is especially important in spacecraft applications since launching costs can be reduced for a given payload or payload can be increased.

DESCRIPTION OF THE INVENTION

Figure 1:
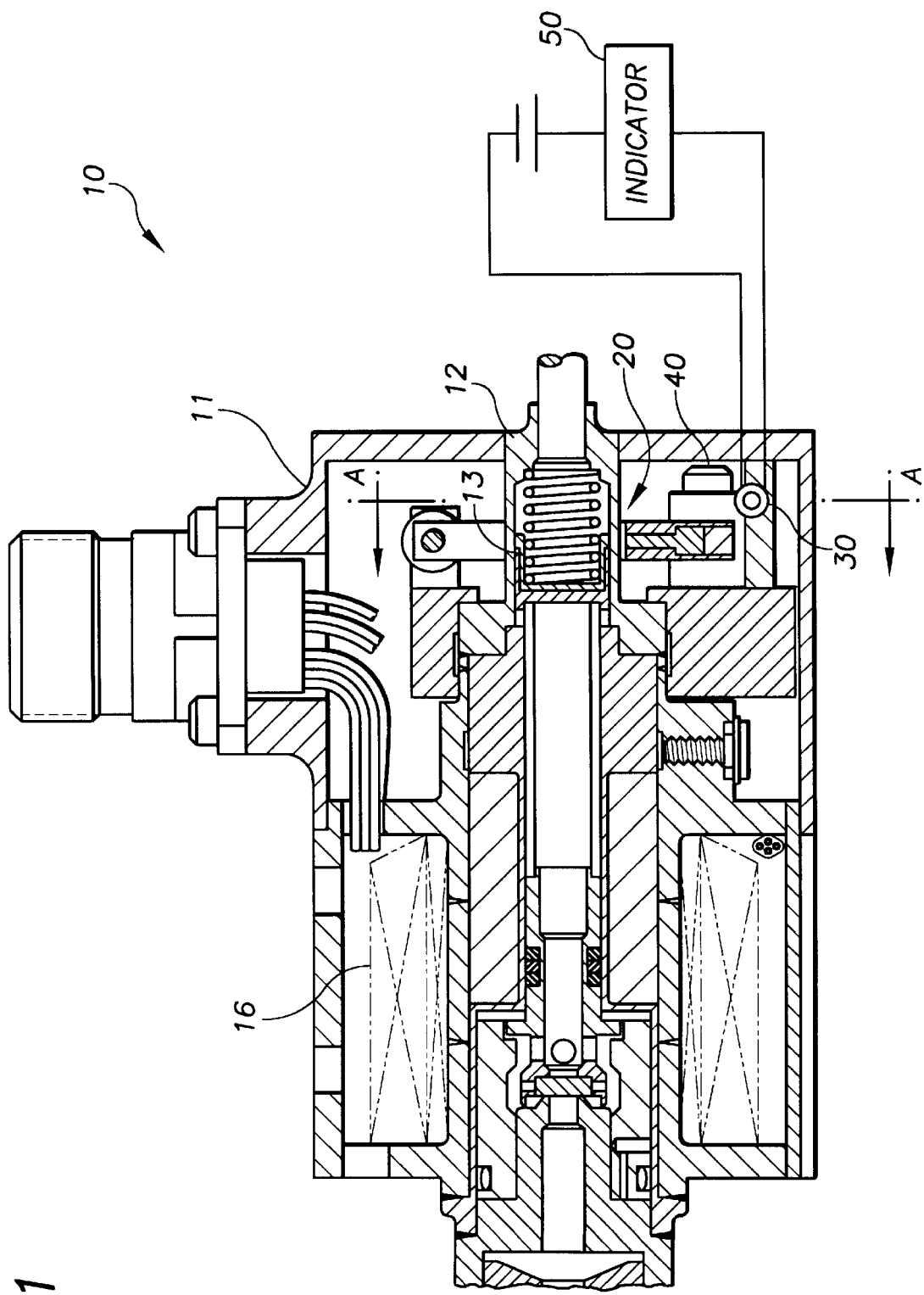
FIG. 1 is a cross-sectional view of a valve incorporating our invention.
Figure 3:
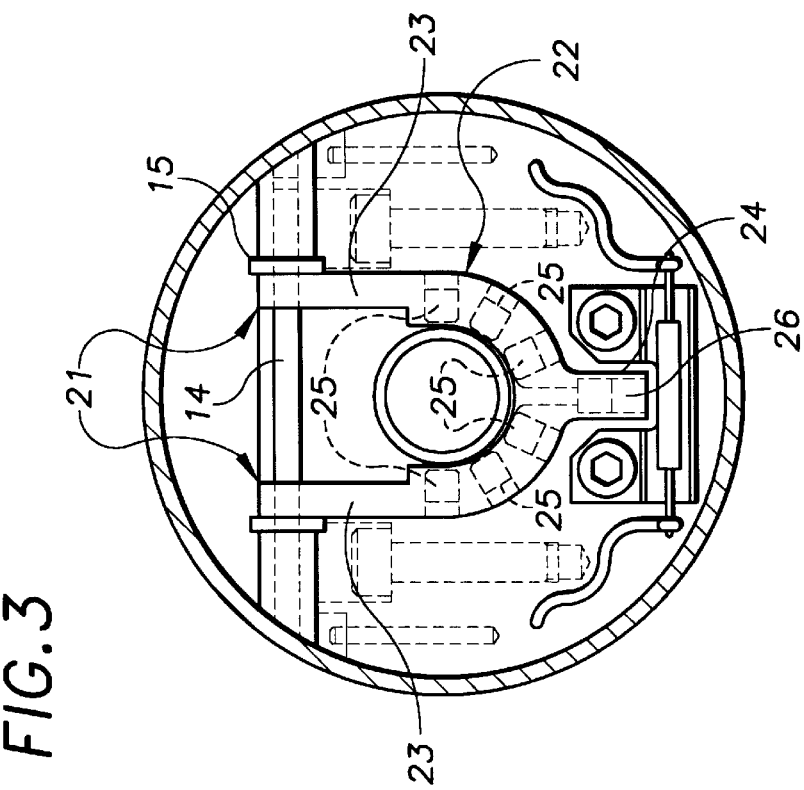
FIG. 3 is a view of the valve incorporating our invention taken along line A—A in FIG. 1.
Figure 2:
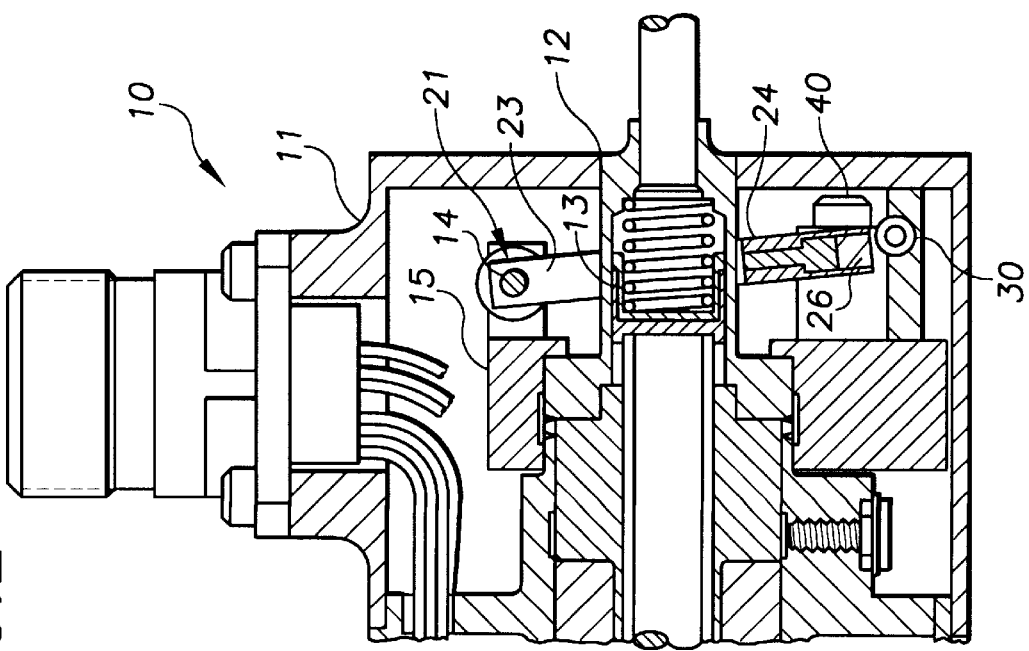
FIG. 2 is another cross-sectional view of a valve incorporating our invention and focusing on the invention.

As seen in the accompanying Figures, we use our magnetic activation system in a valve 10, preferably of the poppettype. The valve 10 includes an outer casing 11 that provides support for an energization coil 16 and a valve housing 12 through which fluid travels. A valve body 13 inside the valve housing controls the flow of fluid through the valve housing 12 and is movable between an open position and a closed position in response to the state of the energization coil 16. We make at least a portion of the valve body out of a nonmagnetic, ferromagnetic material, such as iron.

We attach a follower 20, preferably in the form of a swingarm, to a component that is stationary relative to the valve body 13, such as the valve casing 11 and/or the valve housing 12, via a pivot connection 21. The pivot connection 21 can take many forms, but we prefer to use a pin 14 in a mounting bracket 15 attached to the casing 11 and/or housing 12. The preferred swingarm 20 includes a U-shaped portion 22 arranged so that the valve body 13 is between the curved portion of the U-shaped portion 22 and the pivot connection 21. The arms 23 of the U-shaped portion 22 extend toward the pivot connection 21 on either side of the valve body 13 and terminate at the pivot connection 21. In the preferred embodiment, the end of each arm 23 is pivotably connected to the casing 11 and/or housing 12 via the pin 14 of the mounting bracket 15. The follower also preferably includes an upright portion 24 extending from the U-shaped portion 22 and away from the pivot connection 21. Mounted outside of the valve housing 12, the follower 20 remains isolated from the fluid controlled by the valve 10.

To cause the follower 20 to move when the valve body 13 moves, we arrange following magnets 25, preferably rare earth magnets, in the U-shaped portion 22 of the swingarm 20 so that they are substantially equidistant from the valve body 13. Because the valve body 13 is made from a ferromagnetic material, the following magnets 25 are attracted to the valve body 13. When the following magnets 25 are of sufficient strength, the attractive force between the valve body 13 and follower 20 causes the follower 20 to swing about its pivot connection 21 when the valve body 13 moves. Thus, the follower 20 has positions corresponding to the open and closed positions of the valve body 13.

To prevent the follower 20 from traveling too far, we include a limit stop 40.

The upright portion 24 of the swingarm 20 amplifies the valve stroke of the valve 10. The path of the tip of the upright portion 24 moves through an arc, the upright portion 24 lying on a radius of the arc. When the valve body 13 moves, the U-shaped portion 22 of the swingarm 20 moves a similar linear distance, but the upright portion 24 moves a greater linear distance depending on the length of the upright portion. The tip of the upright portion 24 can, therefore, act on an object much farther away from the valve housing 12 than can the valve body 13.

We place a switch 30 near one of the positions of the follower 20 so that the switch is activated by the follower 20 when the valve body 13 is in one of the open and closed positions. In our preferred embodiment, the switch 30 is magnetically activated. To activate the switch 30 in the preferred embodiment, we include an activating magnet 26, preferably a rare earth magnet, in the upright portion 24 of the follower 20. So, if the system is to indicate that the valve 10 is open, the switch 30 is placed near the follower position corresponding to the valve body's open position. When the valve body 13 moves to its open position, the follower 20 moves to its corresponding position, bringing the activating magnet 26 near the switch 30. The switch 30 is closed by the activating magnet 26 so that an indicator 50 attached to the switch 30 can indicate that the valve 10 is open. "Indicator" is used in a broad sense not limited to indicator lights, but including anything that can indicate that the valve 10 is open.

While we prefer to use a magnetically activated switch, the switch 30 could be mechanically activated by the movement of the follower 20, though with inferior results. The follower 20 could also include only one set of magnets to both follow the valve body 13 and activate the switch 30. For example, if only the following magnets 25 were included, upright portion 24 could be left off of the follower 20 and the switch 30 could be moved closer to the valve body 13. The switch 30 would then be activated by the following magnets 25 when the follower 20 reached the appropriate position. This arrangement, however, would probably provide results inferior to our preferred embodiment. Other shapes could also be used for the follower 20, but it is our belief that the shape we have chosen for our preferred embodiment is the most efficient and provides the best results.

PARTS LIST 10 valve
11 valve casing
12 valve housing
13 valve body
14 pivot pin
15 bracket; pivot mount
16 energization coil
20 follower; swingarm
21 pivot connection between arm and casing
22 U-shaped portion of follower
23 arm of U-shaped portion
24 upright portion of follower
25 following magnet
26 activating magnet
30 switch
40 stop; limit stop
50 indicator

We claim:

1. A magnetic activation system for a switch comprising:

a swingarm that follows a valve body as the valve body moves between first and second valve body positions, the swingarm remaining isolated from a fluid controlled by the valve body;

a first magnet in the swingarm configured to cause the swingarm to follow the valve body and to cause the swingarm to occupy first and second swingarm positions, as well as to swing therebetween, the first and second swingarm positions corresponding to the first and second valve body positions, respectively; and a magnetic switch activated by the swingarm when the swingarm is in one of the first and second swingarm positions.

2. The system of claim 1 wherein the swingarm comprises a substantially U-shaped portion including substantially parallel arms pivotably connected to a valve casing in which the valve housing and the swingarm are enclosed, portions of the arms lying adjacent the valve housing, and the valve housing lying between the valve casing and an upright portion of the swingarm extending substantially parallel to the arms.

3. The system of claim 1 wherein the valve body is a non-magnet and is made from a ferromagnetic material.

4. The system of claim 1 wherein the first magnet comprises a rare earth magnet.

5. The system of claim 1 wherein the first magnet comprises a plurality of magnets arranged in the swingarm so that they are substantially equidistant from the valve body.

6. The system of claim 1 wherein the switch is magnetically activated, fluid is prevented from flowing past the valve body when the valve body is in the first valve body position, fluid flows past the valve body when the valve body is in the second valve body position, and the first magnet activates the switch when the valve body is in the second valve body position.

7. The system of claim 1 further comprising a second magnet in the swingarm, and the second magnet activates the switch when the swingarm is in the one of the first and second positions.

8. The system of claim 7 wherein the second magnet is disposed in an upright portion of the swingarm, the upright portion extending away from another portion of the swingarm along a radius of an arc through which the swingarm travels.

9. In a valve disposed within a casing and comprising a housing and a valve body, the valve body controlling flow of a fluid through the housing, a magnetic activation system for a switch isolated from the fluid flowing through the housing and comprising:

a first magnet mounted in a swingarm;

the swingarm being pivotably connected to the casing;

the valve body being disposed within the housing so that the first magnet follows the valve body, thereby causing the swingarm to swing between a first position and a second position; and a switch disposed near one of the first and second positions of the swingarm so that the switch is activated when the swingarm assumes the one of the first and second positions.

10. The system of claim 9 wherein the first magnet comprises a rare earth magnet.

11. The system of claim 9 wherein the switch is a magnetic switch activated when the swingarm assumes the one of the first and second positions.

12. The system of claim 11 further comprising a second magnet in the swingarm that activates the switch when the swingarm assumes the one of the first and second positions.

13. The system of claim 9 further comprising a stop arranged at one of the first and second positions so that the swingarm stops and rests against the stop when the swingarm is in the one of the first and second positions and the switch lies in proximity to the stop.

14. The system of claim 9 wherein the first position corresponds to a closed position of the valve body in which fluid is prevented from flowing through the housing, the second position corresponds to an open position of the valve body in which fluid passes through the housing, the switch is activated when the swingarm is in the second position, and activation of the switch in turn activates an indicator to indicate that the valve is open.

15. The system of claim 9 wherein the swingarm further comprises:
    a substantially U-shaped portion, the U-shaped portion comprising arms;
    the arms of the swingarm being pivotably connected to the casing, portions of the arms lying adjacent the housing; and
    an upright of the swingarm extending from the U-shaped portion substantially parallel to the arms and being arranged such that the housing lies between the upright of the swingarm and a portion of the casing to which the swingarm is pivotably connected.

16. The system of claim 15 wherein the switch is a magnetic switch, and the upright portion includes a second magnet arranged in an extremity thereof so that the second magnet activates the magnetic switch when the swingarm occupies the one of the first and second positions.

17. The system of claim 16 wherein the first magnet comprises a plurality of magnets arranged in a curved portion of the U-shaped portion so that all of the plurality of magnets are substantially equidistant from the valve body.

18. A valve state indication system disposed within a valve casing, a switch and a valve housing also disposed within the valve casing, and a valve body in the valve housing movable between an open position in which fluid flows through the valve housing and a closed position in which fluid is prevented from flowing through the housing, the valve body being a non-magnetic, the system comprising:
    a swingarm pivotably supported by the casing so that the swingarm can swing between first and second positions in response to movement of the valve body between its closed and open positions, respectively, the swingarm activating the switch in one of the first and second positions;
    a first magnet disposed in the swingarm to cause the swingarm to swing in response to the movement of the valve body between its closed and open positions; and
    the swingarm activating the switch when the swingarm occupies one of the first and second positions, thereby indicating a position of the valve body while remaining isolated from the fluid in the valve housing.

19. The system of claim 18 wherein a stop is disposed in the casing near the switch so that the swingarm lies against the stop when it is in the one of the first and second positions in which the swingarm activates the switch.

20. The system of claim 18 wherein the first magnet comprises a plurality of magnets disposed in a U-shaped portion of the swingarm so that they are all substantially equidistant from the valve body when the swingarm is in the first position, ends of arms of the U-shaped portion being pivotably connected to the valve casing.

21. The system of claim 20 wherein the swingarm further comprises an upright portion extending from a curved portion of the U-shaped portion, the upright portion being substantially parallel to the arms of the U-shaped portion, a free end of the upright portion activating the switch.

22. The system of claim 21 wherein the switch is magnetically activated and is placed near the one of the first and second positions, the free end comprising a second magnet that activates the switch when the swingarm occupies the one of the first and second positions.

23. The system of claim 18 further comprising an indicator connected to the switch for indicating when the switch has been activated.

24. The system of claim 23 wherein the switch is activated when the swingarm is in the second position, thereby causing the indicator to indicate the switch has been activated when the valve body is open.

25. The system of claim 23 wherein the switch is activated when the swingarm is in the first position, thereby indicating that the switch has been activated when the valve body is in the closed position.

26. The system of claim 18 wherein the valve housing is made of a non-magnetic material.

27. A magnetic activation system for a switch comprising:
    a follower isolated from a fluid controlled by a valve body and induced to move in response to movement of the valve body without a mechanical connection therebetween, a magnetic attraction between the follower and the valve body providing sufficient force to induce movement of the follower when the valve body moves;
    the valve body being disposed within a valve housing for movement between an open position in which fluid flows through the valve housing and a closed position in which fluid is prevented from flowing through the valve housing;
    the valve body further being a non-magnet; and
    a switch disposed near one of the first and second positions of the follower, the switch being activated by the follower when the follower is in the one of the first and second positions.

28. The system of claim 27 wherein the follower is a swingarm pivotably connected to a component that is stationary relative to the valve body and the swingarm, the swingarm being induced to swing between first and second positions corresponding to the open and closed positions of the valve body, respectively.

29. The system of claim 28 wherein the valve body is made from a ferromagnetic material, and the swingarm comprises a first magnet arranged so that a force of attraction between the valve body and the swingarm is sufficient to swing the swingarm when the valve body moves.

30. The system of claim 29 wherein:
    the swingarm comprises a U-shaped portion, arms of the U-shaped portion being pivotably connected to the component and the arms being arranged adjacent the valve housing; and the first magnet comprises a plurality of magnets arranged in the U-shaped portion so that they are substantially equidistant from the valve body.

31. The system of claim 30 wherein the swingarm further comprises:

an upright portion extending from the U-shaped portion of the swingarm;

the upright portion being substantially parallel to the arms of the U-shaped portion; and the upright portion activating the switch when the swingarm is in the one of the first and second positions.

32. The system of claim 31 wherein the switch is a magnetic switch, and the swingarm further comprises a second magnet in the upright portion, the second magnet activating the magnetic switch when the swingarm is in the one of the first and second positions.

* * * * *